United States Patent
Praas et al.

(10) Patent No.: US 6,183,910 B1
(45) Date of Patent: Feb. 6, 2001

(54) ELECTROCHEMICAL LITHIUM SECONDARY ELEMENT

(75) Inventors: Hans-Walter Praas, Kelkeim; Sibylle Kemmler-Sack, Tubingen; Peter Endres, Rottenburg, all of (DE)

(73) Assignee: Varta Batterie Aktiengesellschaft, Hannover (DE)

( * ) Notice: Under 35 U.S.C. 154(b), the term of this patent shall be extended for 0 days.

(21) Appl. No.: 08/957,111

(22) Filed: Oct. 24, 1997

(30) Foreign Application Priority Data

Apr. 28, 1995 (DE) .............................................. 195 15 630

(51) Int. Cl.$^7$ ................................................... H01M 4/50
(52) U.S. Cl. ........................ 429/224; 429/231.1; 423/599
(58) Field of Search ................................. 429/224, 231.1; 423/599

(56) References Cited

U.S. PATENT DOCUMENTS

| | | | |
|---|---|---|---|
| 5,169,736 | * 12/1992 | Bittihn et al. | 429/194 |
| 5,196,279 | * 3/1993 | Tarascon | 429/194 |
| 5,240,794 | * 8/1993 | Thackeray et al. | 429/224 |
| 5,316,877 | * 5/1994 | Thackeray et al. | 429/224 |
| 5,658,693 | * 8/1997 | Thackeray et al. | 429/224 |
| 5,702,679 | * 12/1997 | Sheargold et al. | 423/599 |

FOREIGN PATENT DOCUMENTS

| | | | |
|---|---|---|---|
| 712173 | * 5/1996 | (EP) | H01M/4/50 |
| 04-87268 | * 3/1992 | (JP) | H01M/10/40 |

OTHER PUBLICATIONS

Linden, "Handbook of Batteries, 2nd edition", pp. 23. 19–23.20. (No month available), 1995.*

* cited by examiner

*Primary Examiner*—Carol Chaney
(74) *Attorney, Agent, or Firm*—Schnader Harrison Segal & Lewis LLP (57) ABSTRACT

Suitable as active cathode material for an electrochemical lithium secondary cell are oxygen-deficient spinels $Li_{1+x}Mn_{2-x}O_{4-\delta}$, where $0 \leq x \leq 0.33$ and $0.01 \leq \delta \leq 0.5$. Their region of existence in a phase diagram laid out between the corner points $MnO$, $MnO_2$ and $Li_2MnO_3$ for lithium manganese oxide compounds is defined by the corner compounds $LiMn_2O_4$, $Li_2Mn_4O_7$, $Li_8Mn_{10}O_{21}$ and $Li_{4/3}Mn_{5/3}O_4$, all the compounds along the lines $LiMn_2O_4$—$Li_{4/3}Mn_{5/3}O_4$ and $LiMn_2O_4$—$Li_2Mn_2O_4$ being excepted. The spinels are produced by a modified ceramic process from a mixture of Li-containing and Mn-containing starting substances whose reaction product is reduced by roasting in an $Ar/H_2$ atmosphere. The Li components x can be replaced partially or completely by foreign monovalent or multivalent cations from the series consisting of Co, Mg, Zn, Ni, Ca, Bi, Ti, V, Rh or Cu.

5 Claims, 6 Drawing Sheets

ELECTROCHEMICAL LITHIUM SECONDARY ELEMENT

BACKGROUND OF THE INVENTION

1. Field of the Invention

The invention relates to an electrochemical secondary cell having a negative electrode containing lithium as active material, having a positive electrode containing a lithium manganese oxide spinel as active material and having a nonaqueous electrolyte.

The field of application of the invention therefore encompasses all secondary cells whose negative electrodes are composed of lithium metal, a lithium alloy or a carbon material capable of Li intercalation.

2. Description of the Related Art

The importance of lithium manganese oxide spinels for the development of novel rechargeable battery systems already emerges from a series of patent publications, for example U.S. Pat. No. 4,507,371, U.S. Pat No. 4,828,834, U.S. Pat. No. 4,904,552, U.S. Pat. No. 5,240,794. Representatives of this group of compounds which are particularly suitable as active electrode material crystallize in a spinel lattice having a cubic close-packed arrangement of the oxygen atoms, for example $LiMn_2O_4$ and $Li_4Mn_5O_{12}$. Extraction of the Li from $LiMn_2O_4$ with a dilute mineral acid ($H_2SO_4$, $H_3PO_4$, $HNO_3$, $HClO_4$ or $HCl$) or even by electrochemical means results in the formation of a $\lambda$-$MnO_2$. The latter has a defective spinel structure with a reduced lattice constant.

Other compounds such as $LiMnO_2$ have an octahedrally distorted common-salt lattice. In $Li_2MnO_3$, the oxygen atoms form a cubic close packing in which $Li^+$ and $Mn^{4+}$ ions distribute themselves over the octahedral gaps in an alternating layer sequence.

The compounds $LiMn_2O_4$ and $Li_4Mn_5O_{12}$ mentioned are stoichiometric spinels (German Offenlegungsschrift 4119944 ). $LiMn_2O_4$, which is already frequently used as cathode in rechargeable cells and batteries, is produced by causing a lithium salt or lithium hydroxide to react with a manganese oxide at temperatures above 750° C.

In the cubic oxygen lattice of the $LiMn_2O_4$ spinel, the $Li^+$ ions are situated in tetrahedral gaps and the $Mn^{3+}/Mn^{4+}$ ions in octahedral gaps. The lattice constant is 8.25 Å.

The more Li-rich spinel $Li_4Mn_5O_{12}$ can also be described by the formula $Li[Li_{1/3}Mn_{5/3}]O_4$ both stoichiometrically and in regard to the atomic distribution. Like $\lambda$-$MnO_2$, it contains only 4-valent manganese. The crystal symmetry is also cubic, but, because of the substitution of the larger $Mn^{3+}$ ions (r=0.645 Å), which form half of the manganese in $LiMn_2O_4$, by the smaller $Mn^{4+}$ ions (r=0.530 Å) the lattice constant is substantially reduced to 8.17 Å.

Although the substitution of $Mn^{3+}$ by $Li^+$ in accordance with 3 $Mn^{3+} \rightarrow Li^+ + 2\ Mn^{4+}$ results in a higher Li content in the $Li_4Mn_5O_{12}$ in total, when compared with that of the $LiMn_2O_4$, the concentration of the electrochemically active Li is not increased because only the lithium situated in the tetrahedral gaps is accessible under normal potential conditions to an electrochemical intercalation and deintercalation. This is because the additionally intercalated lithium shares the octahedral gaps with the manganese and is immobilized at those points.

It is also known that lithium batteries can be operated at 4V and at 3V with lithium manganese oxide compounds as cathode material. If the spinel $LiMn_2O_4$ is the discharge product, it can be recharged by Li-deintercalation, as a result of which the average oxidation level of the Mn increases from 3.5 to 4 (in the $\lambda$-$MnO_2$). Such a cathode material, corresponding to the general composition $Li_{1-x}Mn_2O_4$ where 0<x<1, can be used for a 4V system. The spinel structure is retained over the entire composition range and the Mn/O ratio is constant.

In the case of a 3V system, the spinel $LiMn_2O_4$ is the cathode material of the general composition $Li_{1+x}Mn_2O_4$, where 0<x<1, in the charged state. Its discharge (intercalation of Li) ultimately results in $Li_2Mn_2O_4$ with tetragonal crystal symmetry. The electrode material consequently becomes a 2-phase material, with the disadvantageous consequences that the reversibility of the electrode reaction decreases (reduced resistance to cycling) and that the Mn ions present in the $Li_2Mn_2O_4$ phase exclusively in the 3-valent state tend to disproportionate in accordance with 2 $Mn^{3+} \rightarrow Mn^{4+} + Mn^{2+}$, in which process they dissolve in the electrolyte as $Mn^{2+}$.

In order to stop, at least partially, the tetragonal distortion of the spinel structure, German Offenlegungsschrift 4328755 has already proposed a stoichiometry $Li_{1+x}Mn_{2-x}O_{4+\delta}$, where $0 \leq x < 0.33$ and $0 \leq \delta < 0.5$, for the cathode material, in which connection the variable parameters x and δ should be chosen so that, in the discharged state in which it is used, the material should still just have a cubic symmetry (spinel lattice) and the mean degree of oxidation of the Mn is not below 3.5.

In contrast to the abovementioned "oxygen-rich" spinels is an oxygen-deficient spinel $Li(Li_{1/3}Mn_{5/3})O_{4-\delta}$, which was characterized by M. N. Richard et al. (Solid State Ionics 73 (1994), 81–91). Here an increasing δ (oxygen deficiency) is responsible for an average degree of oxidation of the Mn which decreases from 4 toward 3.5. As a result, Li can be deintercalated, with simultaneous oxidation of $Mn^{3+}$, with the result that such a spinel can also be used as a reversibly functioning cathode material.

Common to all the known Li-rich spinels of the type $Li_{1+x}Mn_{2-x}O_4$ and all oxygen-rich spinels of the type $Li_{1-x}Mn_{2-x}O_{4+\delta}$ is a relatively low true density and apparent density with large globulitic crystallites and relatively high BET surface (>3 m²/g) . The capacities achievable with the cathode materials vary between 120 mAh/g and 10 mAh/g, depending on the value of x.

Compounds of the type $Li_{1+x}Mn_2O_4$ have, as the stoichiometric $Li_2Mn_2O_4$ is approached, its tetragonal crystal structure (two-phase region) and are therefore no longer in the region of existence of cubic spinels from a crystal-chemistry point of view. In addition, these Li-rich 3V materials, in particular $Li_2Mn_2O_4$, are already unstable in air and are moisture-sensitive.

In most cases, an improved high temperature storage capability and a satisfactory cycling stability are acquired only at the expense of low capacities.

The object of the invention is therefore to provide a cathode material on the basis of a lithium manganese oxide spinel which is as free as possible from the abovementioned deficiencies and can be used in lithium batteries to be operated at 3V or 4V.

SUMMARY OF THE INVENTION

The object is achieved, according to the invention, by an electrochemical secondary cell having a positive electrode, as defined in patent claim 1.

It was found that lithium manganese oxide spinels of the composition $Li_{1+x}Mn_{2-x}O_{4-\delta}$, where $0 \leq x \leq 0.33$ and $0.01 \leq \delta \leq 0.5$, fulfill the expectations. Excluded, however, are all the compounds for which $x=\frac{1}{2}\delta \pm 0.01$, x being dependent on $\delta$ in the relationship mentioned. Preferred are values of $0.02 \leq \delta \leq 0.5$, in particular of $0.05 \leq \delta \leq 0.5$.

The values of x and $\delta$ in the lithium manganese oxide spinels according to the invention are at the same time such that the oxidation level of the central manganese cation is between 3.0 and 4.0. Under these circumstances, the compounds are O-deficient spinels which are preferably single-phase compounds and can be classified as cubic.

Particularly advantageous spinels according to the invention satisfy the composition $Li_{1+x}Mn_{2-x}O_{4-\delta}$, where $0 \leq x \leq 0.33$ and $0.05 \leq \delta \leq 0.5$, excluding all compositions where $x=\frac{1}{2}\delta \pm 0.05$.

The spinels according to the invention are suitable as electrode material in lithium secondary batteries, where they impart to the secondary batteries an improved initial capacity, cycling stability and insensitivity to high-temperature storage. In addition, the novel lithium manganese oxide spinels have, compared with the known spinels, almost double the apparent density, which results in a doubling of the volumetric energy density expressed in watts per liter.

In these spinels, the oxidation level of the central manganese cation should be within the limits 3.4 and 3.8.

In a variant of the spinels according to the invention, the Li excess x extending beyond $Li_{1.0}$ can be replaced partly or entirely by foreign monovalent or multivalent cations.

Preferably, the elements Co, Mg, Zn, Ni, Ca, Bi, Ti, V, Rh and Cu are suitable for such a partial substitution of the Li. The quantitative proportion of the foreign doping depends on the valency of the cation concerned. If D is the doping element and b its valency, the general formula for such a spinel is $Li_1D_{x/b}Mn_{2-x/b}O_{4-\delta}$ if the entire Li component x is replaced by D.

BRIEF DESCRIPTION OF THE DRAWINGS

For a better understanding, the invention is explained below by reference to a few diagrammatic figures.

DETAILED DESCRIPTION

Figure 1:
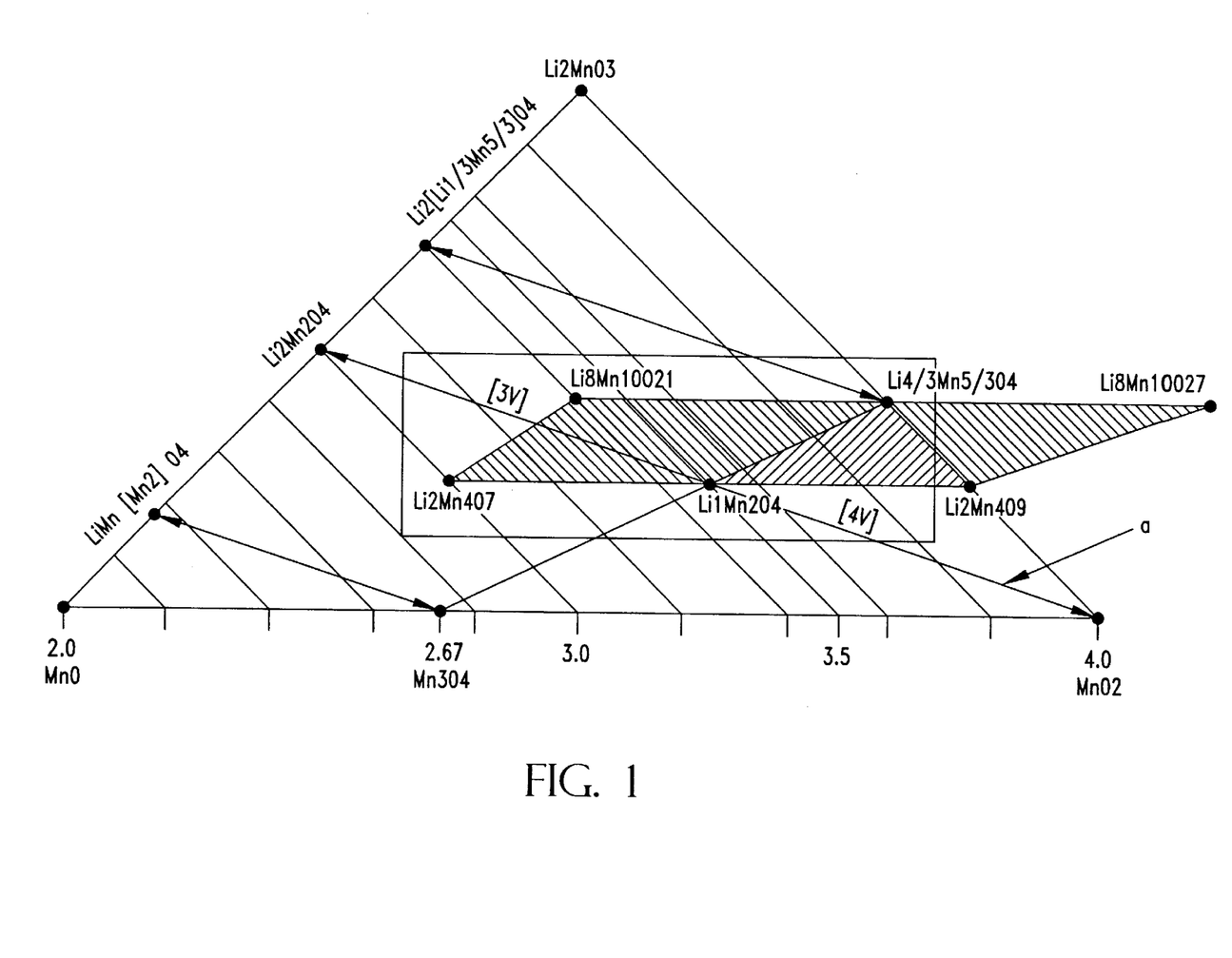
FIG. 1 shows a phase diagram for lithium manganese oxide compounds.

In accordance with FIG. 1, an isosceles triangle laid out between the corner points MnO, $MnO_2$ and $Li_2MnO_3$ was chosen to represent the phase relationships between defined lithium manganese oxide spinels. In this phase diagram, spinels derived from the general formula $Li_{1+x}Mn_{2-x}O_{4+\delta}$, where $0<x<0.33$ and $0<\delta<0.5$ and already disclosed in the patent literature (cf. German Offenlegungsschrift 4328755) are situated in the triangle defined by the corner points $LiMn_2O_4$, $Li_{4/3}Mn_{5/3}O_4$ and $Li_2Mn_4O_9$. The region of existence of known spinels also includes the connecting lines between the said corner points. The connecting line between $LiMn_2O_4$ and $Li_{4/3}Mn_{5/3}O_4$, for example, also characterizes a single-phase transition between these two "ideal" spinel phases.

For the purpose of a better overview of the phase relationships, lines extending parallel to the $Li_2MnO_3$—$MnO_2$ side of the diagram show the respective degree of manganese oxidation at the intersect with the $MnO$—$MnO_2$ side. On the other hand, the lines (a) extending obliquely through the triangle indicate the direction in which deintercalation and reintercalation of the lithium occur. Thus, the lithium deintercalation, for example, from $LiMn_2O_4$ terminates —theoretically—at $\lambda$-$MnO_2$. The obliquely extending lines are therefore charge/discharge characteristic lines.

The region of existence of spinels according to the invention having oxygen deficiency therefore extends within the area defined by the four corner points $LiMn_2O_4$, $Li_2Mn_4O_7$, $Li_8Mn_{10}O_{21}$ and $Li_{4/3}Mn_{5/3}O_4$, except for all those compounds which lie on the connecting line $LiMn_2O_4$—$Li_2Mn_2O_4$ (already disclosed in U.S. Pat. No. 5,196,279) and except for the known compounds situated on the connecting line $LiMn_2O_4$—$Li_{4/3}Mn_{5/3}O_4$, including the corner compounds (cf. U.S. Pat. No. 5,316,877).

As is evident, the degree of oxidation of the central manganese cation can assume values of between 3.0 (in $Li_2Mn_4O_7$) and 4.0 (in $Li_{4/3}Mn_{5/3}O_4$) within this region.

The outer corner points $Li_2Mn_4O_7$ and $Li_8Mn_{10}O_{21}$ result from the general formula according to claim 1 as a result of substituting $x=0$ and $\delta=0.5$ or $x=0.33$ and $\delta=0.5$ and normalization to integer atomic parameters.

As is furthermore evident from the diagram, the novel cathode material comprises degrees of manganese oxidation from 3.0 to 4.0. Accordingly, in the case of more Li-rich compositions it can be used for 3V systems and in the case of more Li-poor compositions for 4V systems.

Figure 2:
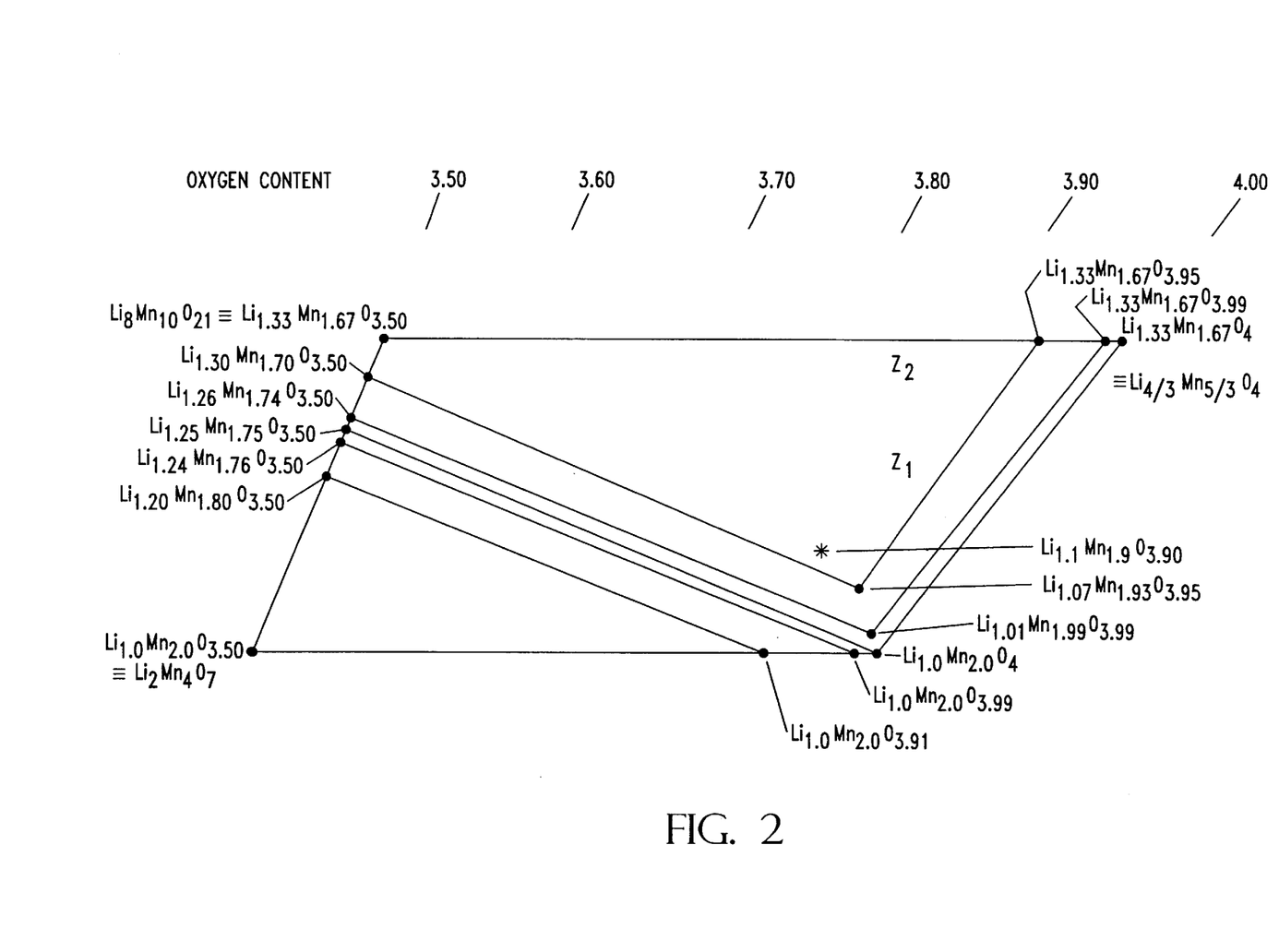
FIG. 2 shows an enlargement of a portion of the phase diagram of FIG. 1.

More details about the region of existence of the O-deficient spinels according to the invention can be obtained from the enlarged portion of the phase diagram according to FIG. 2.

The range defined by patent claim 1 is bounded by the connecting lines $Li_{1.0}Mn_{2.0}O_{3.99}$—$Li_{1.0}M_{2.0}O_{3.5}$ ($\equiv Li_2Mn_4O_7$), $Li_{1.33}Mn_{1.67}O_{3.99}$—$Li_{1.0}Mn_{2.0}O_{3.99}$, all those compositions being excepted which lie on the connecting line $Li_{1.0}Mn_{2.0}O_4$—$Li_{1.25}Mn_{1.75}O_{3.50}$, which are distinguished by the constant Mn/O ratio of 1:2 and which are already disclosed in U.S. Pat. No. 5,196,279.

Also excepted is a range around the said connecting line which extends between the corner compounds $Li_{1.01}Mn_{2.0}O_{3.99}$, $Li_{1.24}Mn_{1.76}O_{3.50}$, $Li_{1.26}Mn_{1.74}O_{3.50}$ and $Li_{1.01}Mn_{1.99}O_{3.99}$ and is generally defined by $Li_{1+x}Mn_{2-x}O_{4-\delta}$, where $0.01 \leq \delta \leq 0.5$ and $x=\frac{1}{2}\delta \pm 0.01$.

Preferably, however, the region excepted from the region of existence of spinels according to the invention is situated between the corner compounds $Li_{1.0}Mn_{2.0}O_{3.99}$, $Li_{1.20}Mn_{1.80}O_{3.50}$, $Li_{1.30}Mn_{1.70}O_{3.50}$ and $Li_{1.07}Mn_{1.93}O_{3.95}$. This results from the general formula if $0.05 \leq \delta \leq 0.5$ and $x=\frac{1}{2}\delta \pm 0.05$.

The spinels situated on the connecting line $Li_{1.0}Mn_{2.0}O_4$—$Li_{4/3}Mn_{5/3}O_4$ are not oxygen-deficient and form a single-phase transition.

O-deficient spinels according to the invention are produced by a ceramic process which is per se generally standard for spinels. The process comprises the following steps:

a. reaction of a lithium-containing constituent selected from the group consisting of lithium salts LiOh x $H_2O$, $Li_2CO_3$ with a manganese oxide at temperatures between 350° C. and 900° C., b. afterroasting of the material at 500° C. to 850° C. and optionally stepwise cooling.

In an advantageous modification of the process, provision is made, according to the invention, that, after the reaction of the lithium-containing constituent with manganese oxide, the reaction product is treated in an $Ar/H_2$ atmosphere at 600° C. to 850° C., that the cooling of the material obtained to room temperature takes place under $Ar/H_2$, and that this is followed by afterroasting of the material at 500° C. to 850° C. and optionally stepwise cooling under $Ar/O_2$.

The cooling under $Ar/H_2$ may take place with slow annealing; quenching may, however, also be advantageous.

Not only can electrolytic manganese dioxide (EMD) be used as starting material, but also chemically produced manganese dioxide (CMD), P-CMD, NMD (pyrolusite) or $\beta$-$MnO_2$ in addition to Li salts, LiOH x $H_2O$ or $Li_2CO_3$. P-CMD is particularly suitable for the first-named ceramic synthesis involving the steps a, b.

P-CMD is a finely porous $\gamma$-$MnO_2$ which is prepared according to U.S. Pat. No. 5,277,890 by wet-chemical means from $MnSO_4$ and $Na_2S_2O_8$. The water content of the LiOH may vary between x=0 and x=2.

The roasting temperature of the stoichiometrically prepared mixtures during phase a is in the range 350° C. to 900° C. and the annealing time is 4 to 80 h (in air).

Spinels obtained under these conditions are notable for high true density and apparent density.

The preparation takes place, for example, as follows:

Synthesis 1

To prepare a spinel of the stoichiometric composition $Li_{1.04}Mn_{1.96}O_{3.94}$, 15.0000 g of P-CMD and 3.6295 g of $LiOH.1H_2O$ are intimately triturated in an agate mortar, the mixture obtained is roasted in a corundum crucible in air for 4 h at 750° C., removed from the furnace at this temperature, cooled to room temperature in air, finely triturated once again, roasted for a further 16 h at 750° C. and finally cooled in air after being removed again from the furnace at the preparation temperature.

The single-phase nature of the material obtained can be demonstrated by means of an X-ray powder diffractogram. In this process, a lattice constant of a =8.237 Å is determined.

The mean oxidation level of the manganese (degree of oxidation) is determined by potentiometric titration (Fe(II)/Ce(IV)) and found to be 3.49.

The Li content and Mn content of the specimen can be determined by ICP analysis.

In the modified ceramic synthesis, both the fresh preparations from step a and the substances obtained from synthesis 1 may serve as precursors. These are now subjected to a roasting treatment in the presence of an Ar/8% $H_2$ gas mixture, in which treatment the spinel decomposes to form a product containing low-valency manganese—preferably $Mn^{2+}$. A direct reduction of the initial spinel to a defined deficient oxygen content is possible in principle, but requires analytical monitoring from case to case.

According to the invention, the reductive decomposition is therefore followed by a repeat roasting treatment in an $Ar/O_2$ atmosphere with the object of oxidizing to a certain oxygen content, the cooling at the end being carried out in the same, weakly oxygen-containing protective atmosphere.

The final product obtained has a defined oxygen deficiency and is also a single-phase compound.

For the aftertreatments, temperatures are used which have already served to prepare the precursor: 350° C. to 900° C.

The preparation of an O-deficient spinel without interruption is possible, for example, in the following way:

Synthesis 2

To prepare a spinel of the composition $Li_{1.1}Mn_{1.9}O_{3.90}$, 12.7663 g of CMD and 3.3534 g of $LiOH\times H_2O$ are intimately triturated in an agate mortar, the mixture obtained is roasted in a corundum crucible for 4 h in air at 700° C., removed from the furnace at this temperature, cooled to room temperature in air, finely triturated once again, roasted for a further 16 h at 700° C. and finally cooled in air after being removed again from the furnace at the preparation temperature.

The material obtained is now decomposed for 3 h at 700° C. in $Ar/H_2$ and quenched to room temperature under $Ar/H_2$. The desired final product is obtained by further treatment for 3.5 h at 700° C., then for 2 h at 650° C. with Ar/8% $O_2$ and cooling in this gas mixture.

Figure 3:
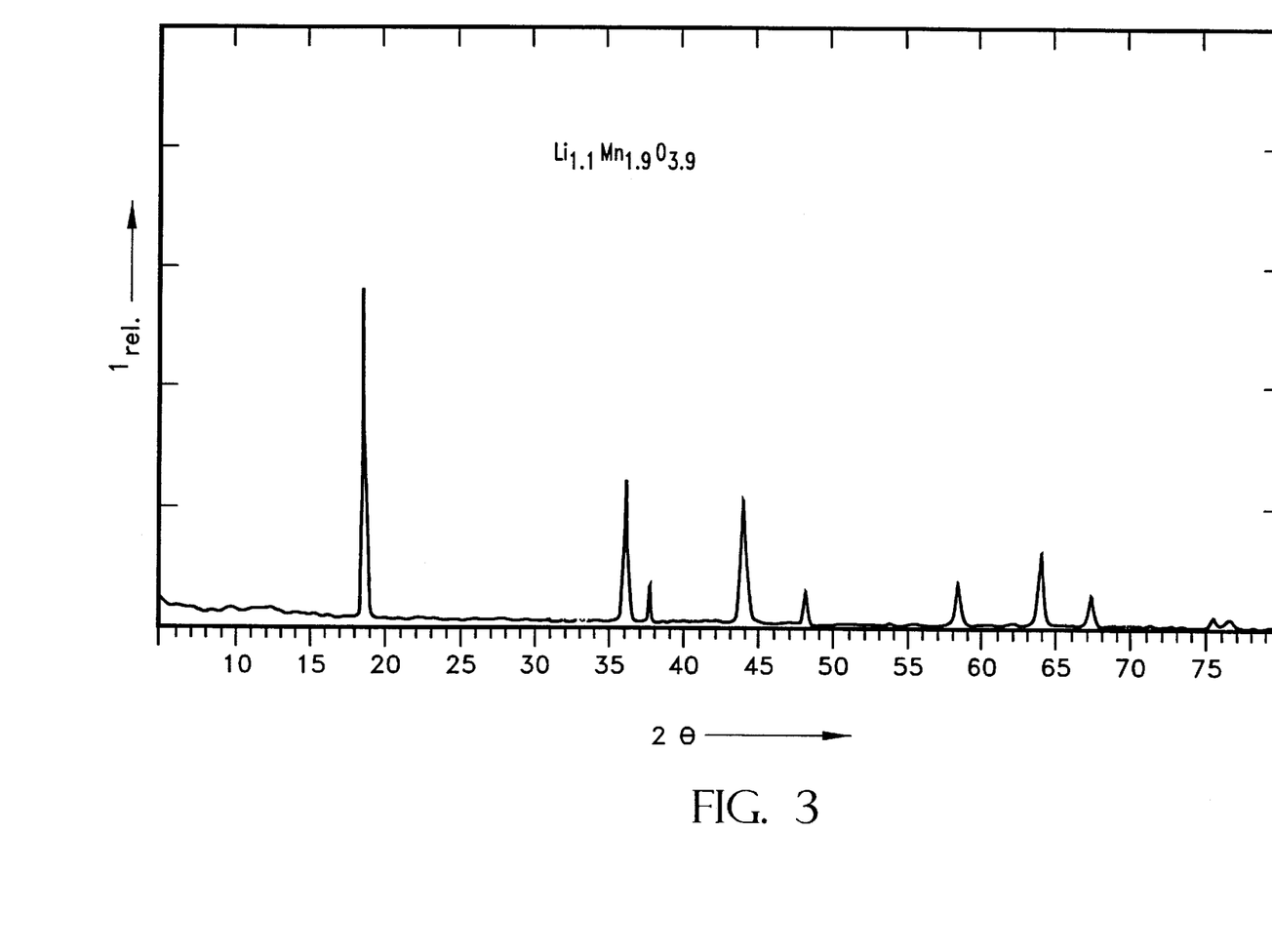
FIG. 3 shows the X-ray powder diffractogram of an O-deficient spinel according to the invention.

From the X-ray powder diffractogram shown in FIG. 3, which can be classified as cubic and confirms the single-phase nature of the material, a lattice constant of a=8.236 was found for this spinel.

The mean oxidation level of the manganese is determined by potentiometric titration (Fe(II)/Ce(IV)) and found to be 3.53 (theoretical 3.53).

The Li content and Mn content of the specimen are determined as in the case of synthesis 1 by ICP analysis.

The spinel $Li_{1.1}Mn_{1.9}O_{3.90}$ prepared by synthesis 2 is plotted in FIG. 2 (enlargement of a portion of the phase diagram) as an asterisk. Further O-deficient spinels according to the invention, which were obtained by synthesis 2, are in the same upper segment of the single-phase region, but they have not been plotted.

For preparations which were completely identical in each case in regard to the initial material weight, the analysis resulted in a slight difference in O content, depending on whether $\beta$-$MnO_2$ or CMD had been used as starting material. These preparations had the following compositions:

Their positions in the phase diagram are denoted by $Z_1$ and $Z_2$, respectively.

The establishment of a somewhat higher oxygen deficiency appears to be promoted by the use of $\beta$-$MnO_2$.

In a modification of the invention, metal compounds containing multivalent metal cations instead of some of the lithium compound as starting substances can also be included in the syntheses described, with the result that lithium manganese spinels are produced which contain a foreign dopant and have an oxygen deficiency. Oxides, carbonates or salts of metals from the series consisting of Co, Mg, Zn, Ni, Ca, Bi, Ti, V, Rh and Cu, and possibly also the pure elements are, for example, suitable for the reaction.

The lattice constants of the O-deficient spinels according to the invention are virtually identical to those of known spinels which are described by the general formula $Li_{1+x}Mn_{2-x}O_{4+\delta}$, where $0 \leq x \leq 0.33$ and $0 < \delta < 0.5$ (cf. U.S. Pat. No. 5,316,877). With increasing values of x, they exhibit a linear drop from a=8.25 Å at x=0 to approximately 8.16 Å at x=0.33. The contraction of the lattice in this direction is in accordance with expectations since, in $Li_{1.33}Mn_{1.67}O_4$, all the manganese is present in the tetravalent state and the $Mn^{4+}$ ions have a smaller radius than the $Mn^{3+}$ ions. The lattice constants do not therefore on their own provide any indication of the presence of an O-deficient spinel.

On the other hand, a nonlinear dependence of the oxidation level of the manganese (degree of oxidation) on the lithium content x is remarkable for O-deficient spinels. In this connection, the $Mn^{4+}/Mn^{3+}$ ratio plays a decisive role for the capacity of lithium manganese oxide spinels for Li extraction and Li intercalation, which can take place either chemically or electrochemically.

Figure 4:
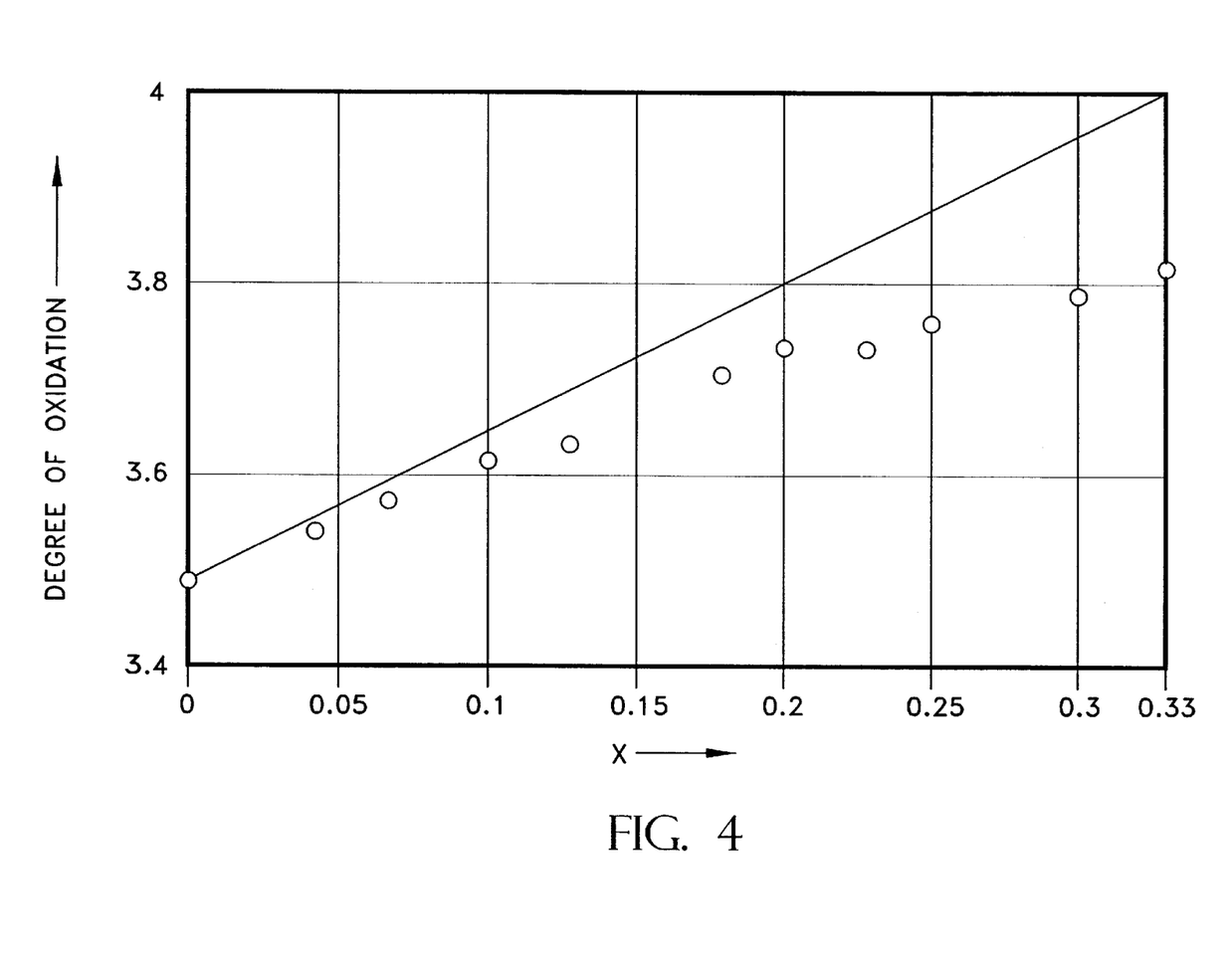
FIG. 4 shows degrees of oxidation of the central manganese cation of O-deficient spinels as a function of the Li content.

FIG. 4 shows how the degree of oxidation ($Mn^{4+}/Mn^{3+}$ ratio) alters within the spinel phase $Li_{1+x}Mn_{2-x}O_{4-\delta}$ with increasing x. For $\delta=0$, the degree of oxidation increases linearly with (calculated straight line) until the Li intercalation terminates at x=⅓ in the spinel $Li_{4/3}Mn_{5/3}O_4$. Despite its high Li content, Li deintercalation is not possible (theoretically, a specific capacity of 216 mAh should be achievable if all the $Li_x$ is reversibly cycled) because all the manganese is present as $Mn^{4+}$ and its further oxidation is not possible under normal conditions.

However, if the spinel has an oxygen deficiency $-\delta > 0$, according to the invention, FIG. 4 shows that these substances, whose increasing Li contents x correspond here to increasing oxygen deficiencies up to $-\delta=0.2$, have an ever-stronger deviation of the $Mn^{4+}/Mn^{3+}$ ratio from the calculated straight line in favor of a residual content of $Mn^{3+}$.

The degree of oxidation is preferably between 3.5 and 3.8. This means that, because of its residual content of $Mn_{3+}$, even the $Li_{4/3}Mn_{5/3}O_{4-\delta}$ spinel can still be cycled with a correspondingly low capacity of about 20 to 50 mAh/g.

Just like the nonlinear dependence of the Mn degree of oxidation on x the nonlinear dependence—which inevitably follows therefrom—of the discharge capacity on x is a reliable criterion for the presence of an O-deficient spinel. The latter relationship becomes clear from FIG. 5.

Figure 5:
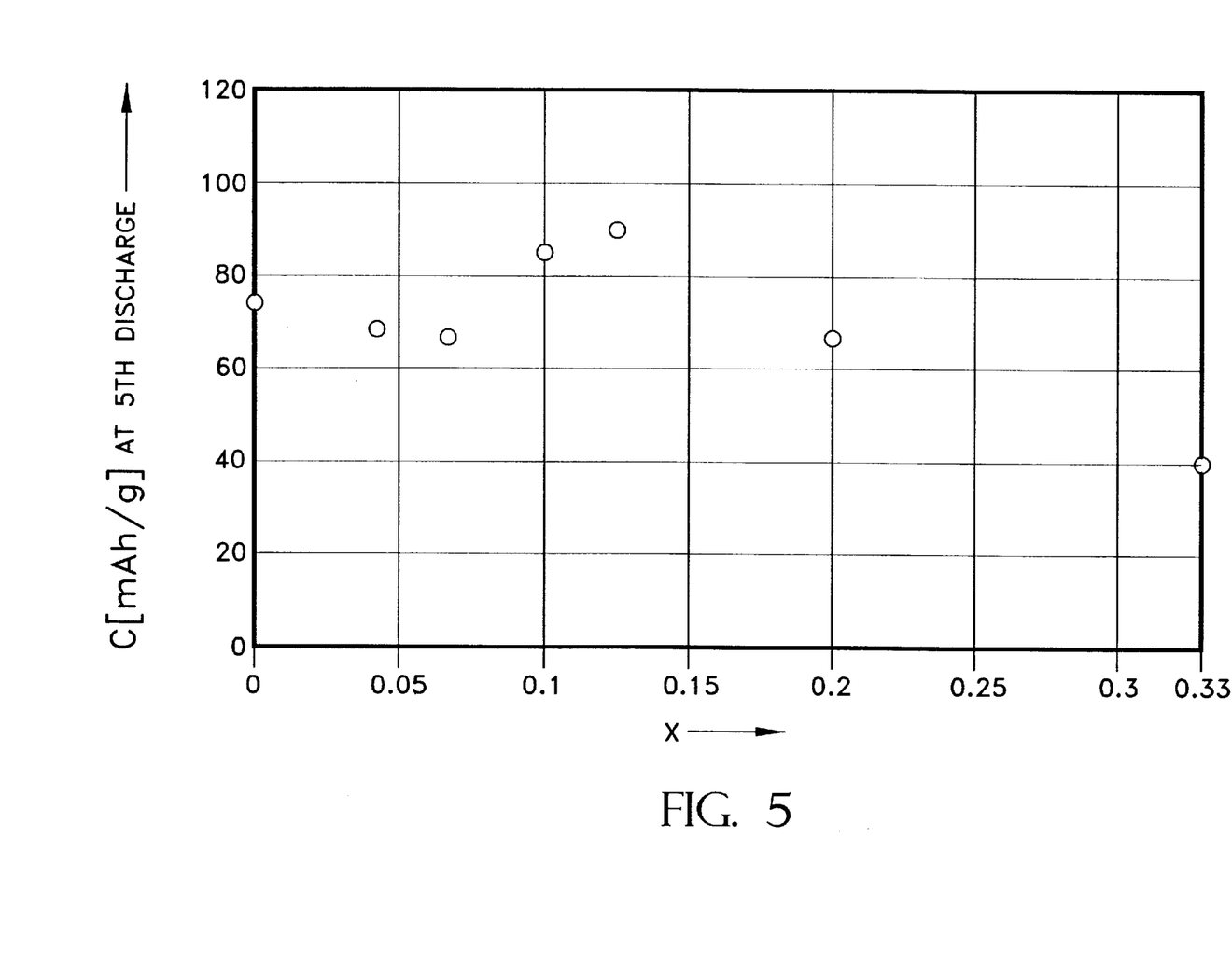
FIG. 5 shows discharge capacities of O-deficient spinels as a function of the Li content.

In the latter, discharge capacities C [mAh/g]—each measured after 5 cycles—are plotted for a plurality of O-deficient spinels against the Li content x. Whereas all the Mn should be tetravalent in the case of known spinels without oxygen deficiency for x=0.33 and a discharge ought not to be possible, the capacity actually observed of approximately 40 mAh/g provides evidence for the fact that an O-deficient spinel is present.

It was found, in addition, that, of the various manganese oxide grades used to produce the spinels, the β-$MnO_2$ apparently has a particularly favorable effect on the capacity characteristic.

This is in accord with the observation, already mentioned, that β-$MnO_2$ has a tendency to produce a somewhat greater oxygen deficiency than CMD.

Figure 6:
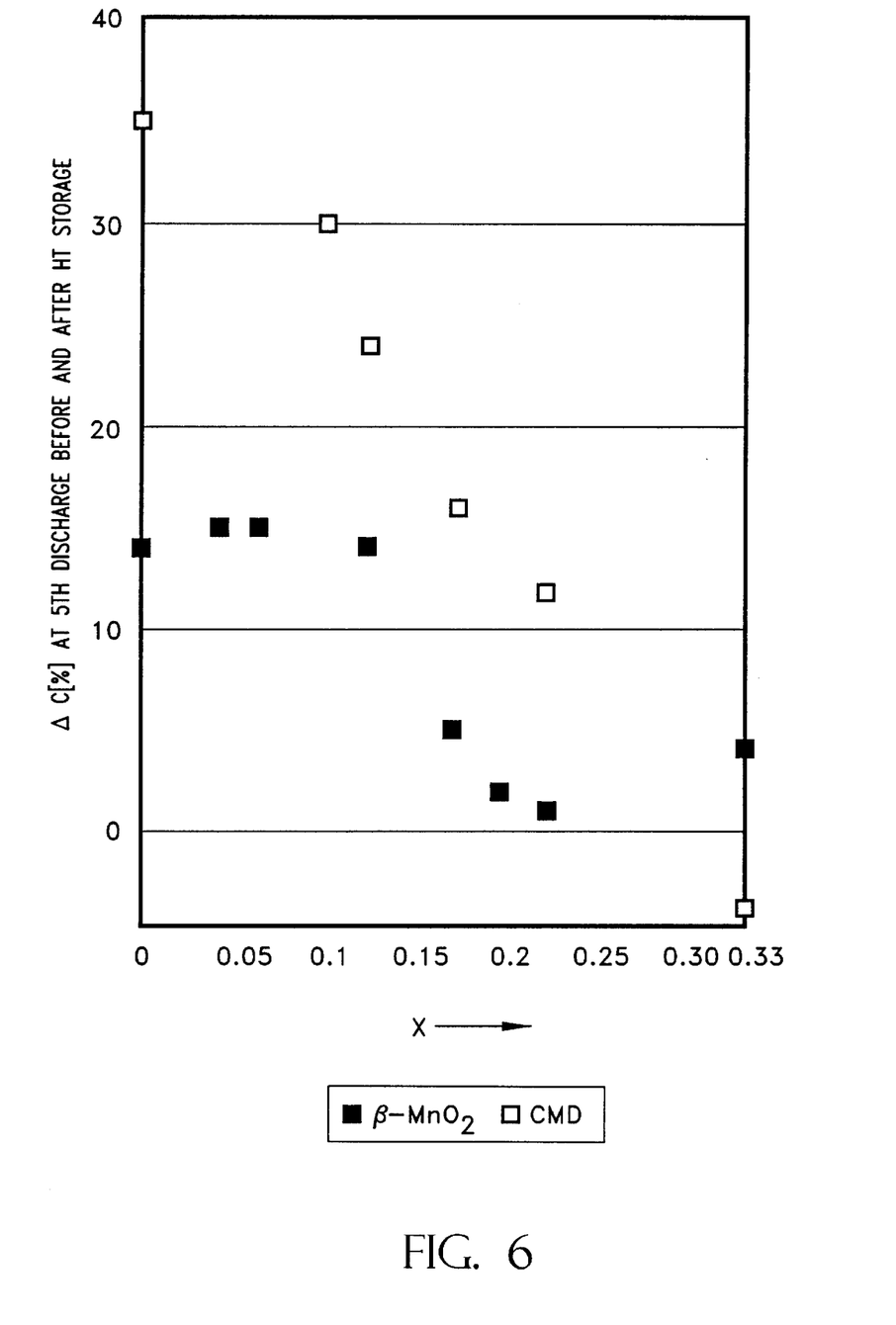
FIG. 6 shows the influence of a high-temperature storage on the capacity behavior of O-deficient spinels.

The preferred suitability of β-$MnO_2$ for the ceramic synthesis of O-deficient spinels finally also finds confirmation in the fact that, in the case of these preparations, the capacity loss which has to be accepted as a result of high-temperature (HT) storage is comparatively low. Thus, it can be seen from FIG. 6, that spinels according to the invention produced with β-$MnO_2$ have capacity losses $\Delta C$ [%] of only between 0% and 15% after the fifth cyclic discharge, which was preceded by a 7-day HT storage at 60° C., compared with specimens which were not HT stored, whereas the capacity losses due to HT storage vary appreciably in the case of spinels produced with CMD and are up to 35% higher.

All in all, however, the O-deficient spinels according to the invention are also notable for good cycling stability and slightly higher mean discharge voltages than known spinels of the type $Li_{1+x}Mn_{2-x}O_{4+\delta}$.

As a result of the special production process involving temporary exposure to an Ar/$H_2$ atmosphere (synthesis 2), an even higher true density and apparent density are achieved than is the case for synthesis 1. Consequently, O-deficient spinels are particularly suitable for improving the energy density per unit volume of wound cells and prismatic cells.

What is claimed is:

1. An electrochemical secondary cell having a negative electrode containing lithium as active material, having a positive electrode containing a lithium manganese oxide spinel as active material and having a nonaqueous electrolyte, wherein the material of the positive electrode is an oxygen-deficient lithium manganese oxide spinel of the general composition $Li_{1+x}Mn_{2-x}O_{4-\delta}$, wherein $0 \leq x \leq 0.33$; $0.01 \leq \delta \leq 0.5$ provided that $x \neq \frac{1}{2}\delta \pm 0.01$; and wherein said composition, with reference to an isothermal slice of a Li-Mn-O phase diagram at 20° C., is defined by the polygon having a boundary of a $Li_2Mn_4O_7$ to $Li_4Mn_5O_{12}$ tie line, a $Li_4Mn_5O_{12}$ to $LiMn_2O_4$ tie line, and a $LiMn_2O_4$ to $Li_2Mn_4O_7$ tie line, wherein the composition excludes points along the $Li_2Mn_4O_7$ to $Li_4Mn_5O_{12}$, $Li_4Mn_5O_{12}$ to $LiMn_2O_4$, and $LiMn_2O_4$ to $Li_2Mn_4O_7$ tie lines and points on the line defined by $LiMn_2O_4$ and $Li_2Mn_2O_4$.

2. A method for producing an oxygen-deficient spinel of the general composition $Li_{1+x}M_{2-x}O_{4-\delta}$, wherein $0 \leq x \leq 0.33$; $0.01 \leq \delta \leq 0.5$ provided that $x \neq \frac{1}{2}\delta \pm 0.01$; and wherein said composition, with reference to an isothermal slice of a Li-Mn-O phase diagram at 20° C., is defined by the polygon having a boundary of a $Li_2Mn_4O_7$ to $Li_4Mn_5O_{12}$ tie line, a $Li_4Mn_5O_{12}$ to $LiMn_2O_4$ tie line, and $LiMn_2O_4$ to $Li_2Mn_4O_7$ tie line, and which composition excludes points along the $Li_2Mn_4O_7$ to $Li_4Mn_5O_{12}$, $Li_4Mn_5O_{12}$ to $LiMn_2O_4$, and $LiMn_2O_4$ to $Li_2Mn_4O_7$ tie lines, and points on the line defined by $LiMn_2O_4$ and $Li_2Mn_2O_4$ as active material for the positive electrode of an electrochemical secondary cell which method comprises the following steps reacting a lithium-containing constituent selected from the group consisting of lithium salts LiOH x $H_2O$, $Li_2CO_3$ with a manganese oxide at temperatures between 350° C. and 900° C., and after roasting the material at 500° C. to 850° C. and cooling the same.

3. The method as claimed in claim 2 wherein, after the lithium-containing constituent has reacted with manganese oxide, the reaction product is treated in an Ar/$H_2$ atmosphere at 600° C. to 850° C. and the material obtained is cooled to room temperature under Ar/$H_2$ and wherein this is followed by an afterroasting of the material at 500° C. to 850° C. and cooling under Ar/$O_2$.

4. An electrochemical secondary cell as claimed in claim 1, wherein some of the Li component x is replaced by an additional monovalent or multivalent metallic cation selected from the series consisting of Co, Mg, Zn, Ni, Ca, Bi, Ti, V, Rh and Cu.

5. The method as claimed in claim 2, wherein, an oxide, a carbonate or a salt-like compound of one of the metals Co, Mg, Zn, Ni, Ca, Bi, Ti, V, Rh and Cu and optionally also the pure metal is used as additional coreactant.

* * * * *